Aug. 5, 1924.
A. M. BRODIE
HUB AND SPOKE CONNECTION
Filed March 16, 1922
1,504,090
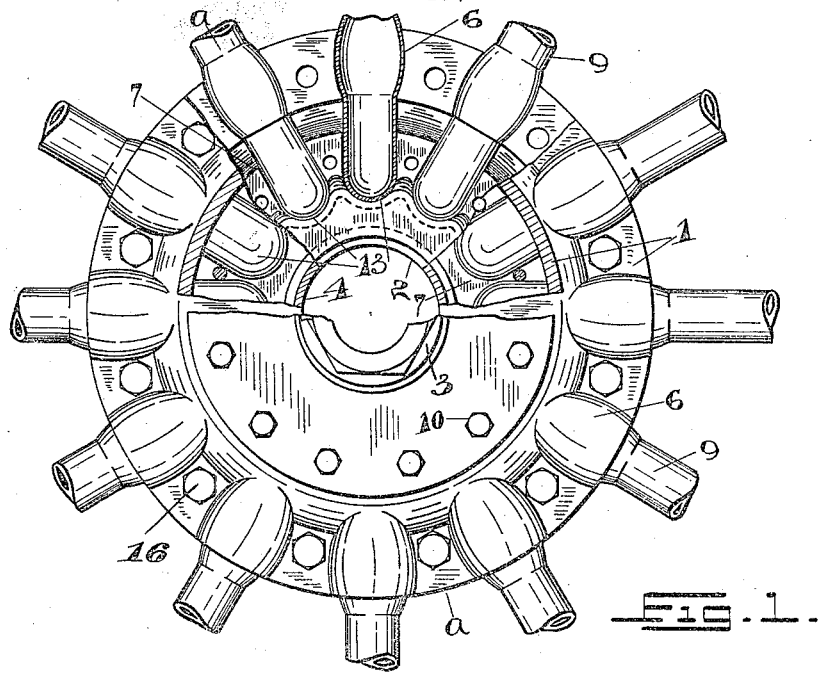
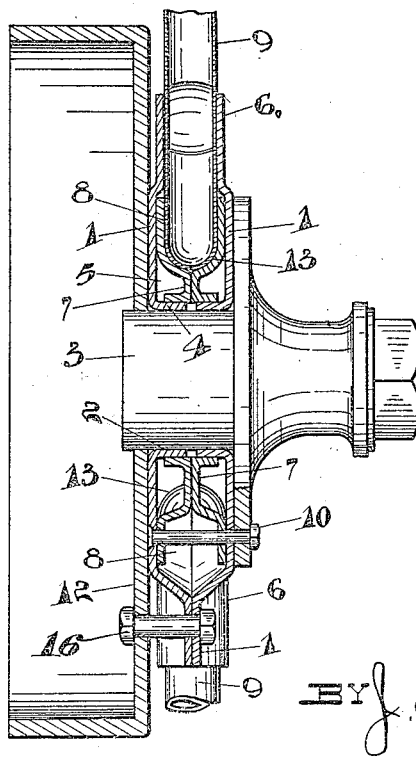
INVENTOR
A. M. Brodie
BY J. Edward Maybee
ATTY Patented Aug. 5, 1924.

1,504,090

UNITED STATES PATENT OFFICE.

ARTHUR M. BRODIE, OF TORONTO, ONTARIO, CANADA, ASSIGNOR TO THE KEMP METAL AUTO WHEEL CO., LIMITED, OF TORONTO, CANADA.

HUB AND SPOKE CONNECTION.

Application filed March 16, 1922. Serial No. 544,195.

*To all whom it may concern:*

Be it known that I, ARTHUR M. BRODIE, of the city of Toronto, in the county of York, Province of Ontario, Canada, a subject of the King of Great Britain, have invented certain new and useful Improvements in Hub and Spoke Connections, of which the following is a specification.

This invention relates to wheels particularly intended for motor vehicles and of the type disclosed in my co-pending application No. 544,194, filed March 16, 1922. This prior construction is very satisfactory, but, owing to the shape of the hub sections and spokes, the size of the brake drum which can be used therewith is limited, and consequently it is necessary to provide a different size of hub section and spoke for each size of brake drum employed.

It is my object therefore to devise a construction of hub section and spoke which will enable me to use brake drums of any desired size, thus avoiding the provision of a multiplicity of sizes of hub sections and spokes, and which will therefore simplify the manufacture of the wheels and reduce the cost of the same.

I attain my object by means of the constructions hereinafter described and illustrated in the accompanying drawings in which—

Fig. 1 is a side elevation, partly broken away, of the hub of the wheel constructed in accordance with my invention, the inner ends only of the spokes being shown; and Fig. 2 a section on the line *a—a* in Fig. 1.

In the drawings like numerals of reference indicate corresponding parts in the different figures.

The hub of the wheel is formed of a pair of sections 1, preferably formed as complementary disks, and each having a central opening 2 for the bearing 3 of the wheel. Each section surrounding the central opening is formed with an inwardly directed flange 4, so that an annular channel 5 is formed between the sections 1. The outer portions of the hub sections are so shaped adjacent their peripheries that they form the outer parts of spoke receiving sockets 6, the sections of the hub between the sockets preferably contacting with one another.

In the annular channel 5 is placed a spoke supporting member 7, preferably formed of a pair of annular members forming between them an annular groove 8, which groove is preferably formed with a plurality of recesses 13 in its bottom for receiving the ends of the spokes 9, which recesses form the inner end of the spoke receiving sockets 6. The contacting surfaces of the annular members forming the member 7 may be, if preferred, spot welded or otherwise secured together.

The portions of spoke receiving sockets 6 between the hub sections 1 are formed so that their greatest width is substantially in the plane of the contacting surfaces of the hub sections.

The hub sections 1 and spoke-receiving sockets 6 are all secured together by bolts 10 passing through alined holes in the various parts.

The spokes 9 are preferably formed of hollow tubing. To prevent rotation of the spokes relative to the hub sections, each spoke is preferably formed with a portion adapted to fit the portions of the sockets 6 between the hub members 1. This may be accomplished in any convenient manner, for example, by deforming the tube at this point, or by casting an outer covering of the desired shape on the tube.

The bearing 3 of the wheel is preferably held in position by the same bolts 10 which hold the hub sections and spoke receiving sockets together, and the brake-drum 12 is secured rigidly in place against the adjacent hub section 1 by bolts 16, of which there is one located between each two spokes as viewed in Fig. 1.

It will thus be seen from the construction described and on reference to the drawings that the widest part of the hub is immediately adjacent the central openings 2; that there are no projections on the side of the hub which will interfere with using brake drums of various sizes; and that the spokes will be securely held in position.

What I claim as my invention is:—

1. An article of the character described, including a pair of hub sections forming an annular channel therebetween, a spoke supporting member composed of a pair of annular members forming an annular groove between them, said groove having a plurality of recesses in its bottom, and spokes having their inner ends inserted in the recesses, and means for securing the hub sections and spoke supporting members together to secure the inner ends of the spokes rigidly in place.

2. In a vehicle wheel, the combination of a pair of hub sections; spoke supporting means provided with sockets located between and positioned by the hub sections, the portions of the hub sections adjacent their peripheries also being shaped to form between them continuations of said sockets; a plurality of spokes having their inner ends received in said sockets; and means for securing the hub sections together.

3. In a vehicle wheel, the combination of a pair of hub sections; spoke supporting means provided with sockets located between and positioned by the hub sections, the portions of the hub sections adjacent their peripheries also being shaped to form between them continuations of said sockets, said continuations having their greatest width substantially in the plane of the contacting surfaces of the hub sections; a plurality of spokes having their inner ends received in said sockets; and means for securing the hub sections together.

Signed at Toronto, Canada, this 7th day of March, 1922.

ARTHUR M. BRODIE.